US008606820B2

(12) United States Patent
Torres

(10) Patent No.: US 8,606,820 B2
(45) Date of Patent: *Dec. 10, 2013

(54) AUTOMATED CONTENT SCHEDULER AND DISPLAYER

(75) Inventor: Damon Torres, New York, NY (US)

(73) Assignee: Robocast, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/495,172

(22) Filed: Jun. 13, 2012

(65) Prior Publication Data

US 2012/0259699 A1    Oct. 11, 2012

Related U.S. Application Data

(63) Continuation of application No. 11/316,209, filed on Dec. 21, 2005, which is a continuation of application No. 09/144,906, filed on Sep. 1, 1998, now Pat. No. 7,155,451, which is a continuation-in-part of application No. 08/922,063, filed on Sep. 2, 1997, now abandoned.

(60) Provisional application No. 60/025,360, filed on Sep. 3, 1996.

(51) Int. Cl.
*G06F 7/00*    (2006.01)
*G06F 17/30*   (2006.01)
*G06F 3/00*    (2006.01)

(52) U.S. Cl.
USPC ............ 707/795; 707/805; 707/913; 715/704

(58) Field of Classification Search
USPC ........................................................ 707/687
See application file for complete search history.

(56) References Cited

U.S. PATENT DOCUMENTS

| 3,577,189 A | 5/1971 | Cocke et al. |
| 5,109,482 A | 4/1992 | Bohrman |
| 5,237,648 A | 8/1993 | Mills et al. |
| 5,305,389 A | 4/1994 | Palmer |
| 5,379,366 A | 1/1995 | Noyes |
| 5,485,609 A | 1/1996 | Vitter et al. |
| 5,515,490 A | 5/1996 | Buchanan et al. |
| 5,544,354 A | 8/1996 | May et al. |
| 5,583,560 A | 12/1996 | Florin et al. |

(Continued)

OTHER PUBLICATIONS

Supporting hierarchical guided tours in the World Wide Web, 1996.

(Continued)

*Primary Examiner* — Kimberly Wilson
(74) *Attorney, Agent, or Firm* — Sofer & Haroun, LLP

(57) ABSTRACT

A method for providing content via a communications network on a user's computer, obtained from a plurality of resources in a organized arrangement, is provided. The method includes creating a show structure of nodes, each node identifying a resource from a plurality of accessible resources, at least some of which are network accessible resources. Without requiring user input, a plurality of the network accessible resources identified by a corresponding node, are automatically accessed. Content corresponding to each of the accessed resources are automatically presented through the user's computer in accordance with the show structure. Interactively variable duration information is provided, representing the duration that the content corresponding to the resource is presented so as to enable a user to vary the duration. Advertisement content is presented to the user in connection with the automatic presentation of the content through the user's computer.

22 Claims, 9 Drawing Sheets

(56) References Cited

U.S. PATENT DOCUMENTS

| | | | |
|---|---|---|---|
| 5,625,781 A | | 4/1997 | Cline et al. |
| 5,659,793 A | | 8/1997 | Escobar |
| 5,668,788 A | * | 9/1997 | Allison .................... 345/173 |
| 5,724,567 A | | 3/1998 | Rose et al. |
| 5,726,909 A | | 3/1998 | Krikorian |
| 5,740,549 A | * | 4/1998 | Reilly et al. ............ 705/14.42 |
| 5,751,672 A | * | 5/1998 | Yankowski ................ 709/238 |
| 5,752,160 A | | 5/1998 | Dunn |
| 5,754,172 A | | 5/1998 | Kubota |
| 5,778,187 A | | 7/1998 | Monteiro et al. |
| 5,793,980 A | * | 8/1998 | Glaser et al. .............. 709/231 |
| 5,796,945 A | | 8/1998 | Tarabella |
| 5,802,292 A | | 9/1998 | Mogul |
| 5,809,247 A | | 9/1998 | Richardson et al. |
| 5,861,906 A | | 1/1999 | Dunn |
| 5,862,325 A | | 1/1999 | Reed et al. |
| 5,890,172 A | | 3/1999 | Borman et al. |
| 5,892,507 A | | 4/1999 | Moorby |
| 5,950,165 A | | 9/1999 | Shaffer |
| 5,956,716 A | | 9/1999 | Kenner et al. |
| 6,026,368 A | * | 2/2000 | Brown et al. ............ 705/14.56 |
| 6,034,652 A | * | 3/2000 | Freiberger et al. ........... 715/730 |
| 6,044,205 A | | 3/2000 | Reed et al. |
| 6,064,370 A | * | 5/2000 | Wang et al. ................ 345/163 |
| 6,084,582 A | | 7/2000 | Qureshi et al. |
| 6,088,717 A | | 7/2000 | Reed et al. |
| 6,108,001 A | | 8/2000 | Tuttle |
| 6,119,135 A | | 9/2000 | Helfman |
| 6,182,072 B1 | | 1/2001 | Leak |
| 6,199,076 B1 | | 3/2001 | Logan et al. |
| 6,289,165 B1 | | 9/2001 | Abecassis |
| 6,338,044 B1 | | 1/2002 | Cook et al. |
| 6,345,288 B1 | | 2/2002 | Reed et al. |
| 6,346,951 B1 | | 2/2002 | Mastronardi |
| 6,486,895 B1 | | 11/2002 | Robertson |
| 6,572,662 B2 | | 6/2003 | Manohar |
| 6,588,015 B1 | | 7/2003 | Eyer et al. |
| 6,760,009 B2 | * | 7/2004 | Omura et al. .............. 345/157 |

OTHER PUBLICATIONS

Scripted Documents: A Hypermedia Path Mechanism, Nov. 1989.
Information Retrieval from Hypertext Using Dynamically Planned Guided Tours, 1992.
Guided Tours and Tabletops: Tools for Communicating in a Hypertext Environment.
CCI Slide Show.
Adding Browsing Semantics to the Hypertext Model.
Travels Around a Learning Support Environment: Rambling, Orienteering or Touring?, 1988.
RMM: A Methodology for Structured Hypermedia Design, Aug. 1995.
Guided Tours and On-Line Presentations: How Authors Make Existing Hypertext Intelligible for Readers, Nov. 1989.
The Distributed Link Service: A Tool for Publishers, Authors and Readers.
Automatic touring in a hypertext system, Mar. 1993.
Microsoft PowerPoint Handbook.
Zoomable user interfaces as a medium for slide show presentations, 2001.
The Amsterdam Hypermedia Model.
Flying Through Hypertext, 1991.
Scripted Documents: A Hypermedia Path Mechanism, 1989.
WWW-Based Presentations as a Complementary Part of Conventional Lectures in the Basics of Informatics, 1998.
A playback schedule model for multimedia documents, 1996.
An architecture and a data model for integrated multimedia documents and presentational applications, 1995.
Automatic temporal layout mechanisms, 1993.
Design Strategies for Scenario-based Hypermedia: Description of its Structure, Dynamics, and Style, 1992.
Continuous media described by time-dependent data, 1995.
Query by Browsing: An Alternative Hypertext Information Retrieval Method, 1989.
Finding facts vs. browsing knowledge in hypertext systems, 1988.
Tools for Specifying and Executing Synchronized Multimedia Presentations, 1991.
Specifying temporal behavior in hypermedia documents, 1993.
As We May Think, Jul. 1945.
HMT: Modeling Temporal Aspects in Hypermedia Applications, 2000.
Cooperative Use of MHEG and HyTime in Hypermedia Environments, Sep. 1997.
Automatic Temporal Layout Mechanisms Revisited, Feb. 2005.
Touring and Navigating a Global Learning Environment—the Web 1994.
Information Agents for Automated Browsing, 1996.
The Microsoft Interactive TV System: An Experience Report, Jul. 1997.
Interactive cable channel set 1995 service startup; venture links ACTV with Prime Ticket, William Morris. (ACTC Inc.), Feb. 14, 1994.
ACTV, Inc. Presents Nation's First Individualized Sporting Events; Prime Sports West's Lakers and Kings 'Interactive' via L.A. Project, May 2, 1995.
Wink Adds World Wide Web Access for Millions of Set-Tops, 1996.
The story so far: an Internet TV timeline, Mar. 1998.
Wink Communications Signs Early Adopter Agreement With Cross-Industry Digital Enhanced TV Group, Jul. 28, 1998.
-INTEL: Cross-industry group presents specification for enhanced television programs, Jul. 29, 1998.
Internet and Interactive Television: Competition or Cooperation?, 1997.
Extending WWW to support Platform Independent Virtual Reality.
Create a new market niche dated Feb. 14, 1997.
EDS CoSourcing dated Feb. 14, 1997.
Jupiter Predicts Net Markets for 2002 dated Mar. 4, 1997.
Vendors to Simplify Web Advertising dated Feb. 24, 1997.
Internet TV—A New Technology Hits the Streets, May 1997.
Inverted Web: How net is Becoming More Like Television to Draw Advertisers dated Dec. 13, 1996.
E-mail from Peter Naylor dated Nov. 25, 1996.
Secret Research Commissioned by Softbank/Networld+Interop Reveals Internet World's Strength as a Major Networking Event dated Mar. 18, 1997.
Reprinted from the Nov. 17, 1997 Issue of Advertising Age, "PC Planners link users to advertisers' Web sites".
Internet TV—A New Technology Hits the Streets.
The World Wide Wait: Don't Get Mad, Get Off.
Highlights Morgan Stanley dated Feb. 1996.
The Internet Advertising Report.
Infoseek latest to get patent dated Sep. 8, 1997.
The Internet: Coming Soon to a TV Near You, Nov. 2, 1997.
Net diverts TV viewing, execs say dated Oct. 21, 1997.
New net ads make a noise dated Sep. 3, 1997.
Case: Shift to user-friendly view dated Dec. 10, 1997.
Real Developer Program dated Aug. 11, 1997.
Real Developer Program Application Form dated Aug. 11, 1997.
RealVideo 1.0 Features and Benefits dated Aug. 11, 1997.
Websprite Delivers Offline Radio dated Feb. 12, 1997.
Insider Profile: Philip Rosedale dated Nov. 20, 1997.
Microsoft's Other Mantra: What Would You Like to Watch Today? dated Apr. 7, 1997.
Researching the Net advertising business model dated Apr. 7, 1997.
Company Failures Underline Blindness of Push Vendors dated Aug. 4, 1997.
E-mail from Damon Torress to Sarah deHavenon-Fowler and Thomas G. Goldsworthy dated Mar. 7, 1998.
Let's begin the WaveTop demol dated Sep. 15, 1997.
WaveTop Program Guide dated Feb. 15, 1997.
RadioTop dated Feb. 15, 1997.
Windows 98 to use Web broadcasting dated Oct. 8, 1997.
Microsoft aggressive as lines between Internet, TV blur dated Jul. 29, 1997.
Net TV will attract new audience dated Mar. 5, 1997.

(56) References Cited

OTHER PUBLICATIONS

When Time ran out on interactive TV dated May 6, 1997.
Success—The Magazine for Today's Entrepreneurial Mind dated Apr. 1997, "The Next Big Thing: Point Cast Invented in a New Medium—Now Let the Battle Begin".
In-Your-Face Browsing dates Mar. 26, 1997.
Online papers turning profit dated Feb. 11, 1997.
Microsoft to acquire WebTV dated Apr. 6, 1997.
Microsoft's Mundie Outlines Digital Broadcast Strategy at NAB '97 dated Apr. 15, 1997.
Internet World—The Magazine for Internet Users dated May 1997.
Internet World May 1997 p. 56.
The Most Award-Winning PC line of 1996. Isn't that a whole new award?
LookSmart dated Nov. 9, 1996.
LookSmart—About Us—Why is LookSmart different dated Nov. 19, 1996.
LookSmart—About Us—It's a smart way to advertise on the Web dated Nov. 19, 1996.
LookSmart—It's a smart way to advertise on the Web dated Nov. 19, 1996.
Online ads adding up dated Jun. 4, 1997.
Survey says 21 percent of U.S. adults are online dated Jan. 27, 1998.
MS invests $1 billion in Comcast dated Jun. 9, 1997.
The WebTV Mission.
WebTV Networks at a Glance.
The WebTV Reference Design.
WebTV—Partnering for Success.
WebTV—About the Founders.
Investors flock to WebTV dated Oct. 1, 1996.
Concentric Network dated Aug. 17, 1996.
High-speed rollouts under way dated Jul. 28, 1997.
@Home pipes in audio dated Jul. 25, 1997.
@Home beefs Up Ad Development Group dated Feb. 14, 1997.
Microsoft: Cable Net access savior? date Jun. 9, 1997.
Brief Article dated Nov. 21, 1994.
Absolute Powerpoint.
JavaScript Internet Tours dated Jul. 16, 1997.
Internet Video Comes of Age—Industrial-Strength Streaming Video, Sep. 22, 1997.
Speed Browsing dated Apr. 1997.
Architecting Personalized Delivery of Multimedia Information dated Dec. 1992.
Internet World—Speed the Web dated Apr. 1997.
Dell Computer Advertisement, "The Most Award-Winning PC Line of 1996".
NetGuide Magazine dated Jun. 1997.
PUSH!—kiss your browser goodbye: The radical future of media beyond the Web dated Mar. 1997.
Planning for PUSH—How to seize control of the technology that's sweeping the web.
Beware of the Big Push dated May 15, 1997.
The News you want on your PC dated May 27, 1996.
Don't surf to us, we'll surf to you dated Sep. 9, 1996.
It's called Webcasting, and it promises to deliver the info you want, straight to your PC dated Feb. 24, 1997.
McAfee uses BackWeb to automatically send updates of its anitvirus software.
What Makes Arrive Work.
Nbc Desktop Video, PBS, and Cisco Join VDOnet Initiative to Bring Multicast Video to the Internet.
CMP media launches First-TV now Viewers can see original programming exclusively availble on the net, 24 hours a day at no cost, Sep. 18, 1996.
First-TV eyes up indie shorts for Internet TV dated Sep. 27, 1996.
USA TODAY—Today First TV dates Nov. 1, 1996.
High Tech in Lowertown dated Oct. 21, 1996.
Pioneer Press dated Oct. 21, 1996.
Entertainment Weekly dated Nov. 8, 1996.
USA TODAY—Internet premieres TV network dated Sep. 19, 1996.
Streaming Audio salvages mostly dismal election night coverage on the Internet dated Nov. 11, 1996.
CMP Advertisement, What do Dr Ruth, Eric Howell, Bill Gates and the Z-Man have in common, Jan. 23, 1997.
Pump up the Web dated Jan. 1997.
Various News Articles, Daily Variety Dec. 13, 1996.
Scott Bourne of First-TV and Denisha Raulston of Vollmer PR gave their insight into what online journalists like a press kit to contain.
Microtimes dated Feb. 5, 1997.
Future television services to offer viewers access to Internet dated Nov. 17, 1996.
Interactive Public Relations Dec. 15, 1996.
CMP Advertisement, Life Radio Online. Your Audio Guide to Everything on the Net.
Star Tribune dated Jan. 21, 1997.
CMP Advertisement, Cash in on the Internet! Want High.
Earthlink Network—TotalAccess Internet.
CMP First-TV Premiere Program, Sep. 18, 1996.
Excite Launches a Web Tour Service, Reprinted from Web Week, vol. 2, Issue 16, Oct. 21, 1996.
Audio and Video Over the Net dated Nov. 1995.
Real Revolution dated Oct. 1997.
We interrupt this magazine for a special bulletin PUSH!—Kiss you browser goodbye: The radical future of media beyond the Web.
Method and apparatus for retrieving data from a network using location identifiers dated Jun. 28, 1999, US5890172.
Robocast launches Robocaster and Roboplayer web page players dated Apr. 5, 1999.
Alexa Internet and Netscape Communications Team to Provide Related Sites dated Sep. 9, 1998.
Your Cyberspace Trail Guide dated May 1998.
UUNET Technologies and USA networks partner to bring live TV to the Internet, Feb. 28, 1996.
Netcom Business Services.
About VDOlive Technology & Software.
BackWeb speeds push technology dated Apr. 1, 1997.
Arrive networks "Pushes" the Envelope dated Mar. 31, 1997.
The day the Browser died dated Mar. 20, 1997.
IFusion Com Annouces $5 million investment led by Prudential Securities dated Mar. 31, 1997.
The New York Times Business—"I wonder what's on the PC tonight" dated May 8, 1994.
Net TV race still wide-open dated May 27, 1997.
The Intranet Channel dated Jun. 10, 1997.
Multicasting: What Push Really Needs to take off Dated Jun. 1997.
There's room for push/pull and publish/subscribe in I/S dated Jul. 1997.
Planning for Push dated May 1997.
PointCast curries investor favor dated Apr. 29, 1997.
IConWorks.
Real Broadcast Network.
broadcast.com.
Explorer beta ready to channel dated Jul. 15, 1997.
PointCast.
PointCast appoints seasoned executives to lead new advertising sales team dated Apr. 8, 1998.
Column: Why no one wants to talk about push dated Nov. 11, 1997.
Newspage: You'll never get your news the same way again.
Enliven Release 1.0.
Pointcast Network 1.1—Free news you can use dated Dec. 1996.
Headliner—Delivers and organizes your choice of news and information from the web.
PUSH the Information the Enterprise the Technology.
Marimba tries to reach intranets, extranets dated Feb. 13, 1997.
Freeloader Announces the Release of FreeLoader Version 1.0.
For Sale : Freeloader dated Feb. 12, 1997.
Special Report: push technologies dated Feb. 10, 1997.
How to pick the right web push dated Feb. 10, 1997.
Taking stock of the web dated Feb. 10, 1997.
Top news feed gets newsier dated Feb. 10, 1997.
Wall street Journal now available 'After Dark' dated dated Feb. 6, 1997.
Infomercials headed to the Web? dated Feb. 11, 1997.

(56) References Cited

OTHER PUBLICATIONS

E-mail—PointCase Press Release dated Feb. 15, 1997.
Freeloader, Feb. 11, 1997.
E-mail—Builder Blast: the pull of Push dated Nov. 6, 1997.
E-mail—Live Powerpoint over the Internet Dated Jul. 9, 1997.
About inCommon dated Dec. 22, 1996.
WavePhore Plans wireless consumer service dated Feb. 11, 1997.
Like Pizza, Your Internet future will be delivered dated Dec. 12, 1996.
My way lands content partners dated Feb. 10, 1997.
This browser is a bruiser dated Jun. 23, 1997.
The Mac Almanac from 1994.
The WebBook and the Web Forager: An Information Workspace for the World-Wide Web dated Apr. 1996.
Adding Multimedia Collections to the Dexter Model dated Sep. 1994.
Surfing the Movie Space Advanced: Navigation in Movie-Only Hypermedia dated Nov. 1995.
How to Use Windows 95 from 1995.
A Tutorial on Authorware dated Apr. 1996.
Comparative Design Review: An Exercise in Parallel Design dated Apr. 1993.
News On-Demand for Multimedia Networks from 1993.
Synchronized Multimedia Integration Language, Working Draft and related articles from Nov. 1997.
Station Break software ("Station Break") dated May 20, 1997.
ViewMovie plug-in for QuickTime ("ViewMovie") from Feb. 1996.
World Wide Web Consortium Workshop, "Real Time Media and the Web".
Javascript Sourcebook: Create Interactive Javascript Programs for the World Wide Web by Gordon McComb (Published in Jul. 1996) ("Javascript Sourcebook").
Stanford News Release, "Standford Student Pioneering Animated Newspaper"(Jun. 1, 1992) ("Standford News Release") Web Post by Noah Mercer, "Proteus, multimedia supplement to the Daily" (May 29, 1993) ("Proteus Web Post").
DeskScape: An Experimental Web Browser (Mar. 1995) ("DeskScape").
Guinan, Information Retrieval from Hypertext Using Dynamically Planned Guided Tours (1992) (Guinan).
Kodak Carousel Slide Projectors, Models 850, 850H, 860 and 860H ("Kodak Slide Projectors"). These products were publicly released in the U.S. at least by Sep. 1971.
Microsoft PowerPoint Handbook (1992) and Using PowerPoint for Windows 95 (1995) ("Microsoft PowerPoint").
PointCast software ("PointCast"). This software was publicly released in the U.S. at least by Feb. 1996.
Zellweger, Scripted Documents: A Hypermedia Path Mechanism (Nov. 1989) ("Zellweger").
Toward Automatic Generation of HyTime Applications, Buford, Rutledge & Rutledge (1994) ("Buford").
WebSeer: An Image Search Engine for the World Wide Web, Charles Frankel, Michael J. Swain, and Vassilis Athitsos (Aug. 1, 1996) ("Frankel").
The DAD486x Digital Audio Delivery System (at least as early as Jun. 30, 1995) ("DAD486x").
NetJumper (at least as early as Oct. 8, 1996) ("NetJumper") "Code related to concurrently submitted U.S. 5890172".
WebBook/ Web Forager Products (at least as early as Sep. 8, 1995) ("WebBook/ Web Forager").
A W3C article entitled "The Channel Definition Format," Castedo Ellerman (Mar. 10, 1997) (Ellerman).
Supporting Hierarchical Guided Tours in the World Wide Web by Franz J. Hauck (May 6-10, 1996) ("Guided Tours").
CCI Slide Show by Alan Braverman (Sep. 22, 1994) ("CCI Slide Show").

* cited by examiner

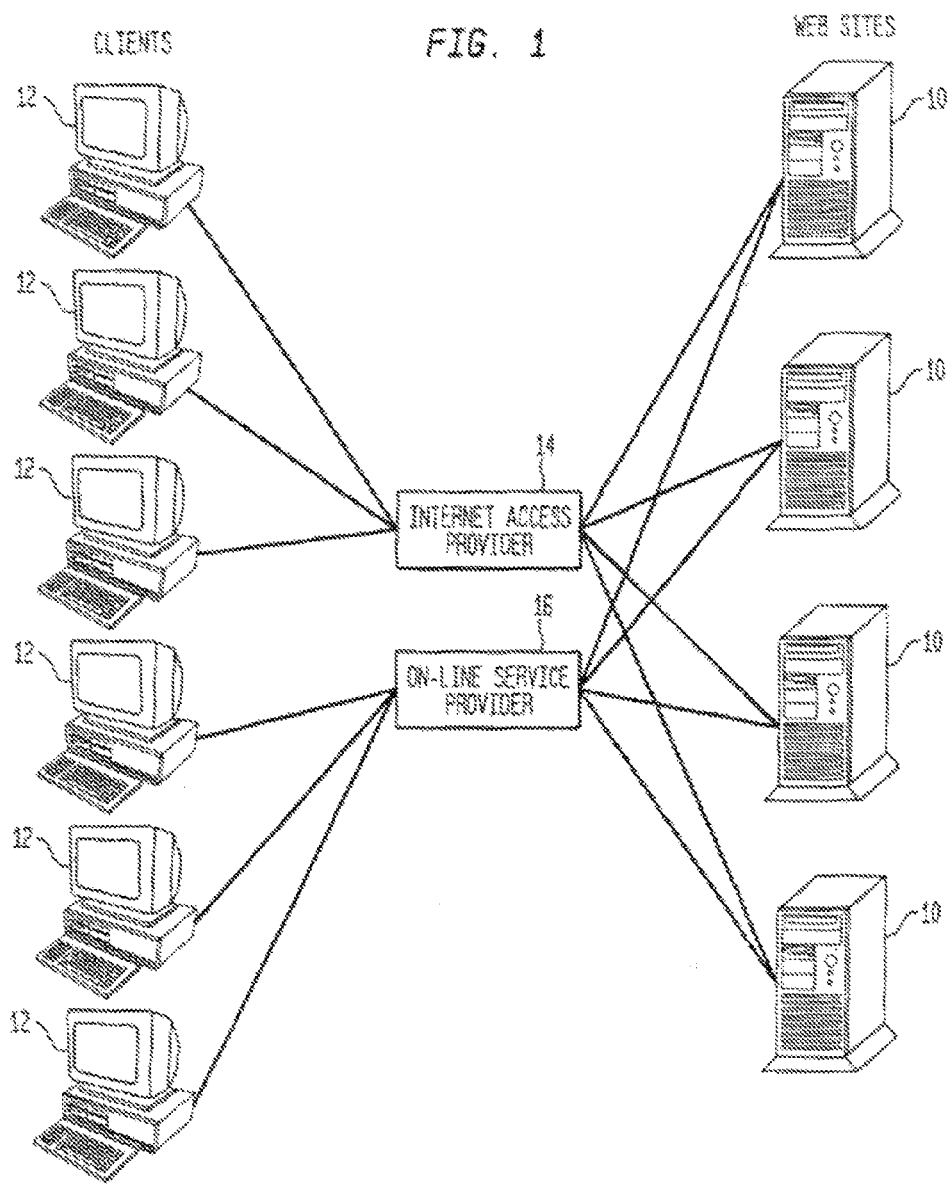

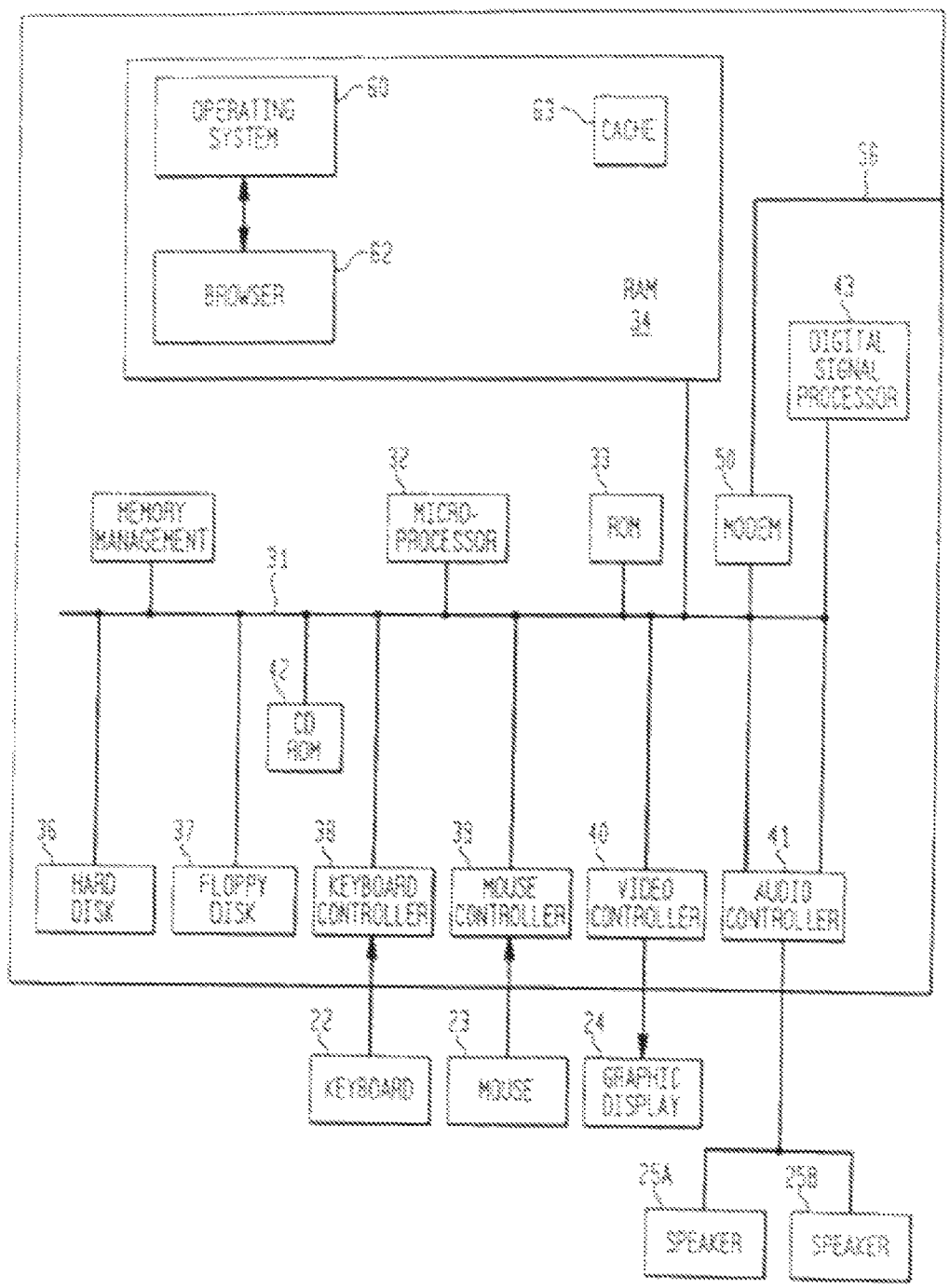

NODES AND PATHS THROUGH STRUCTURES

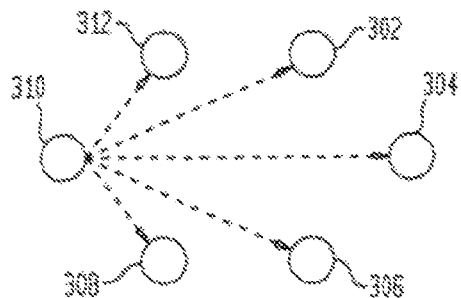

FIG. 2C

UNIQUE PATHS WITH THE SAME STARTING POINT AND A LENGTH OF ONE IN A NETWORK OF SIX RESOURCES

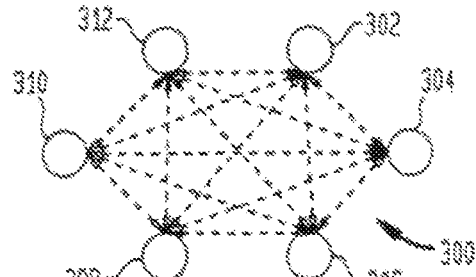

FIG. 2B

ALL POSSIBLE PATHS FROM ONE NODE TO ANOTHER IN A NETWORK OF SIX RESOURCES

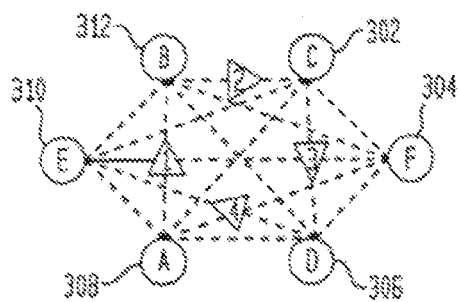

FIG. 2D1

A PATH WITH A LENGTH OF FOUR IN A NETWORK OF SIX RESOURCES

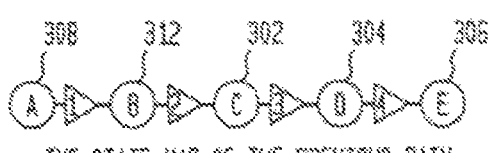

FIG. 2D2

THE STATE MAP OF THE PREVIOUS PATH

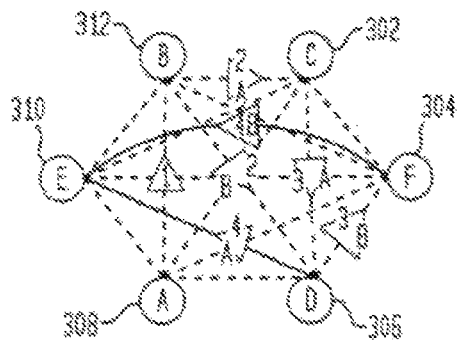

FIG. 2E

A MULTIPATH WITH A LENGTH OF FOUR IN TWO POSSIBLE PATHS IN A NETWORK OF SIX RESOURCES

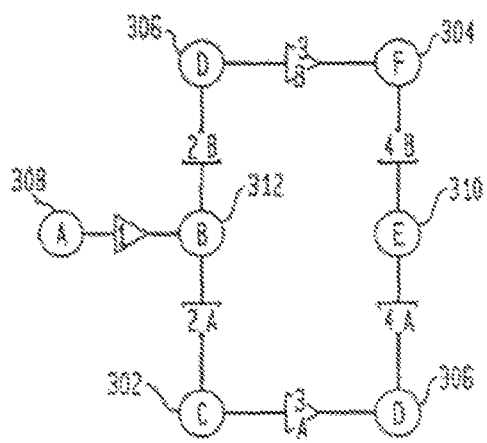

FIG. 2F

THE STATE MAP OF THE PREVIOUS PATH

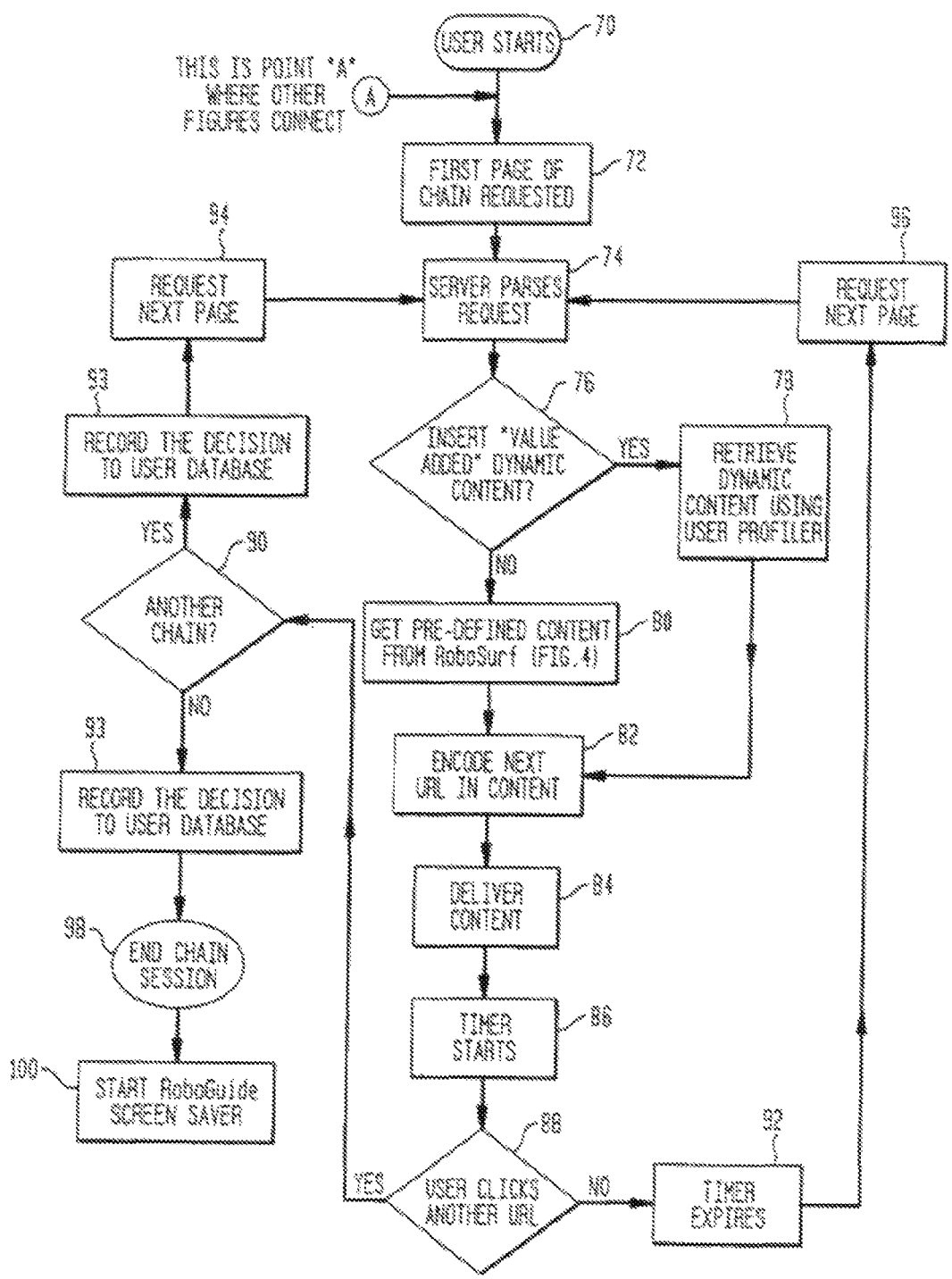

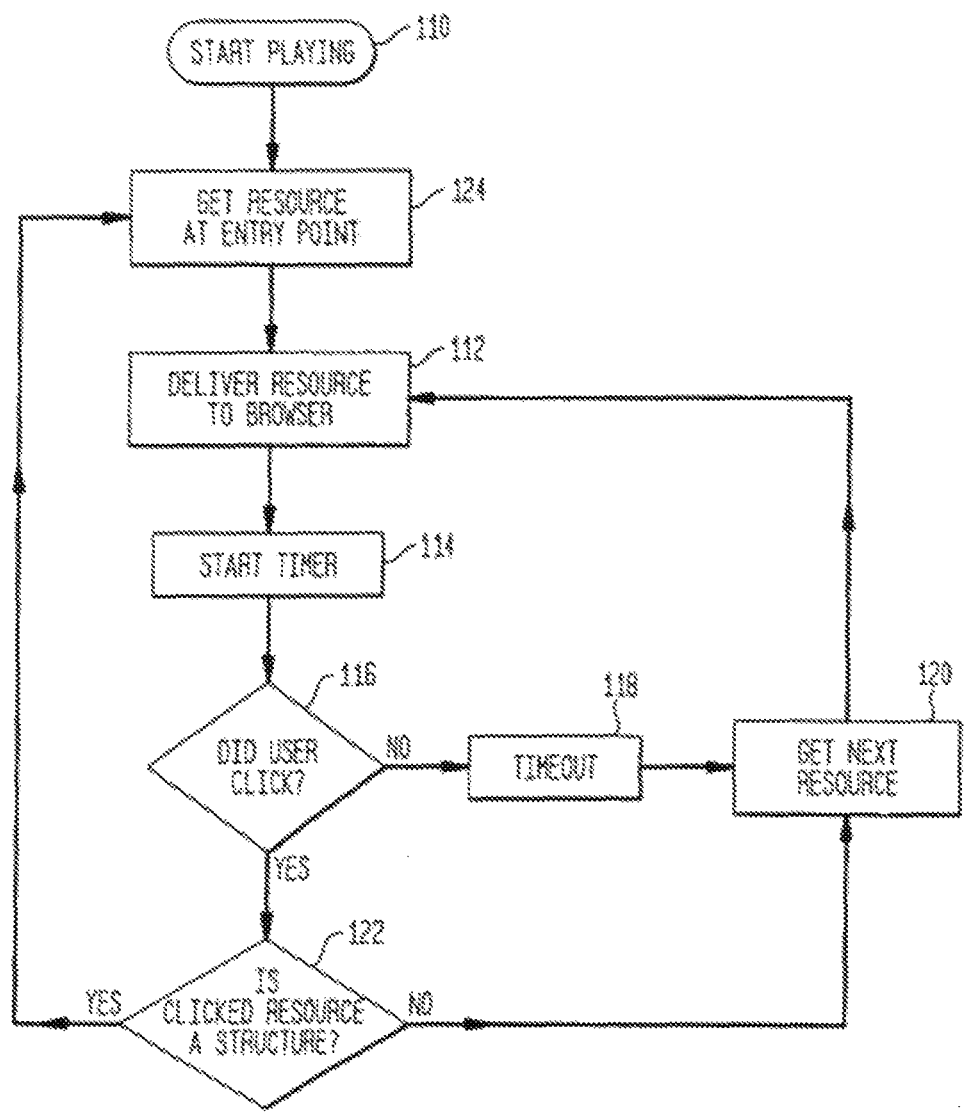

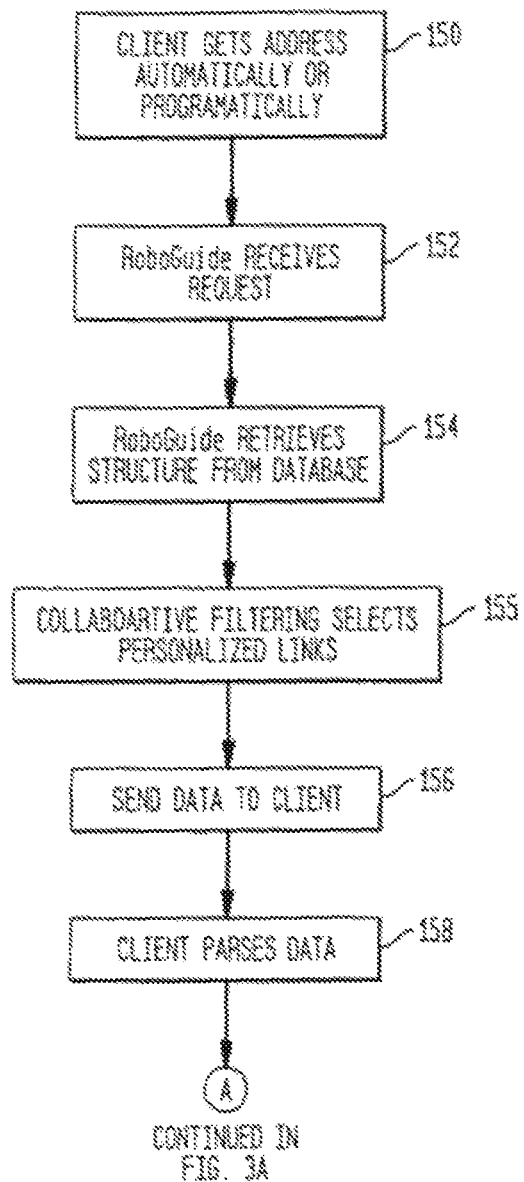

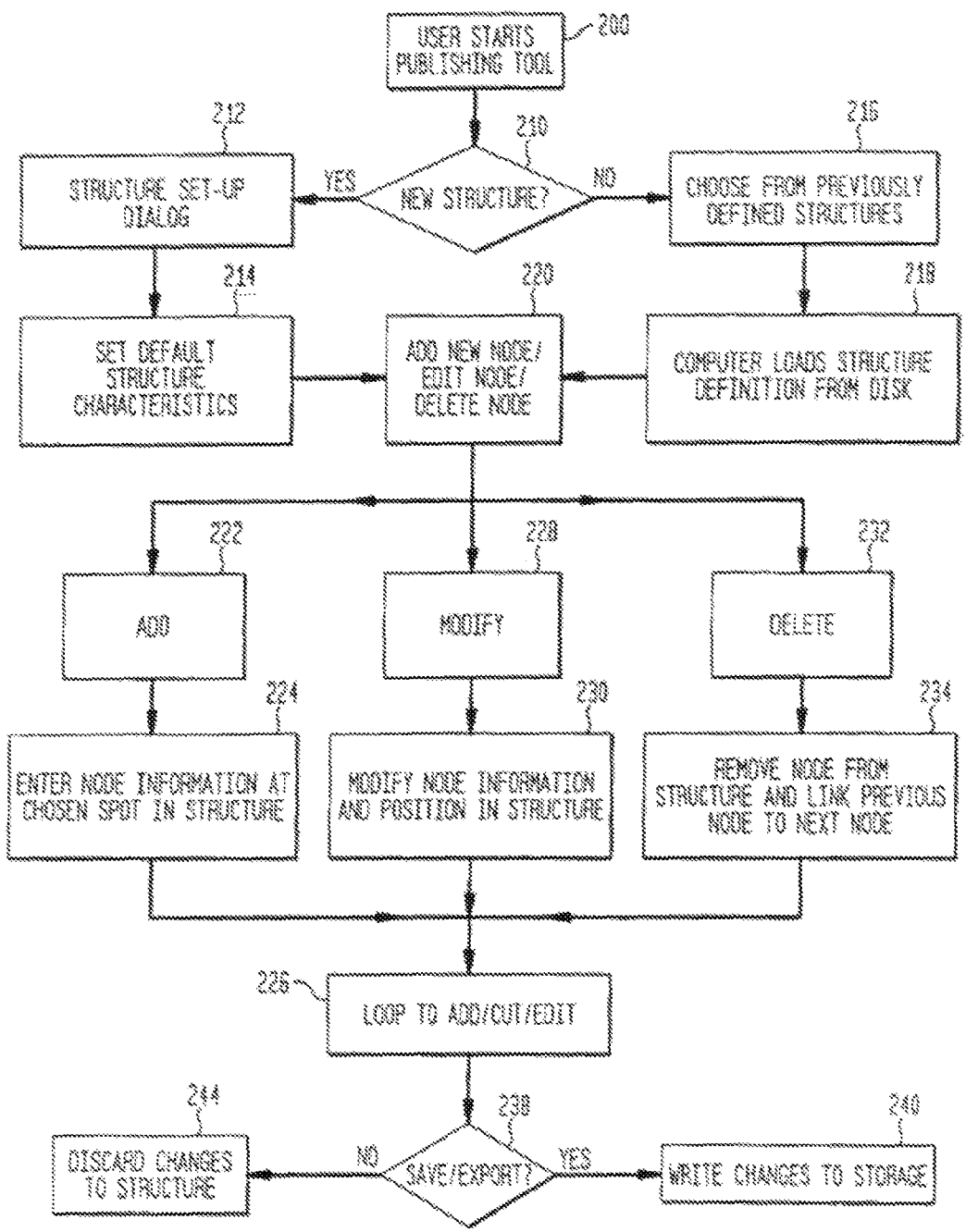

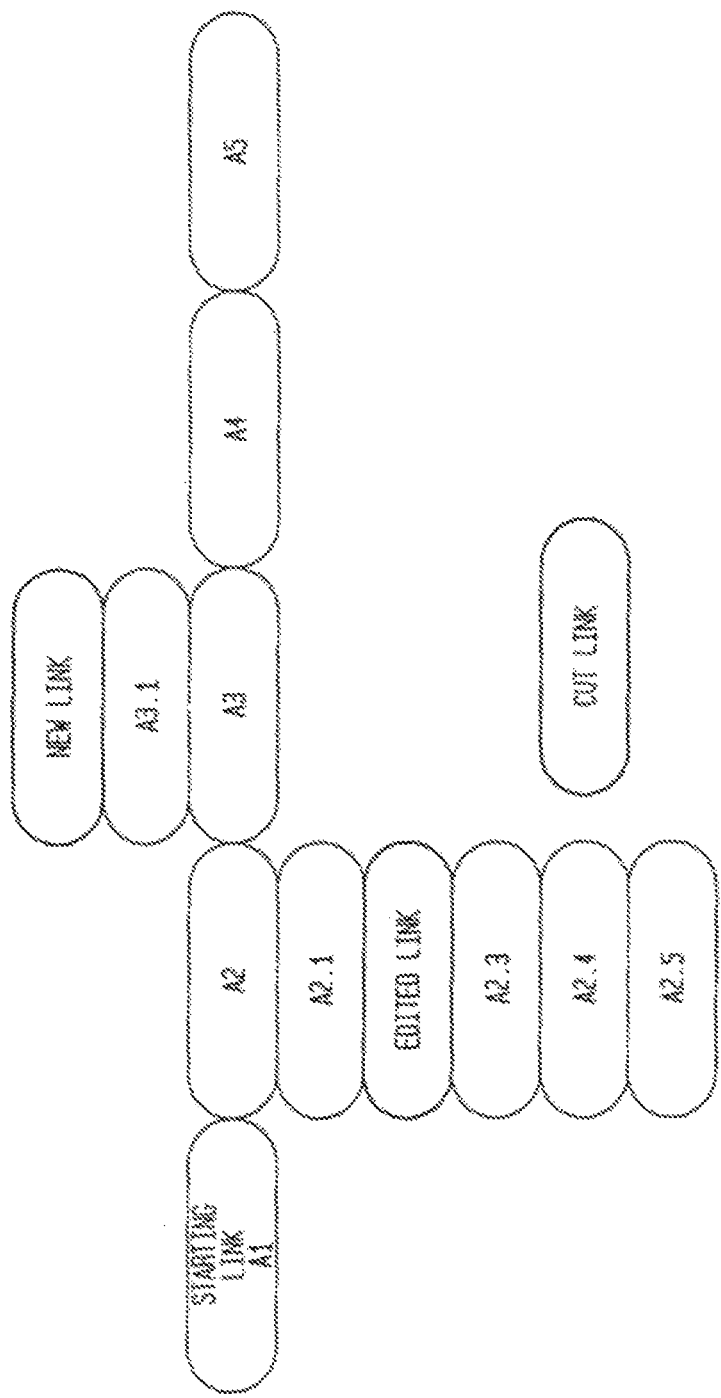

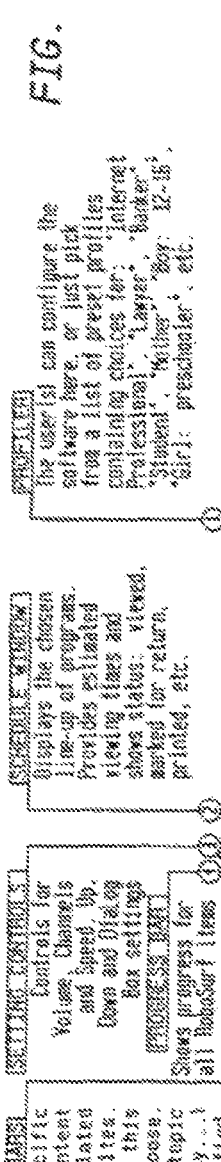
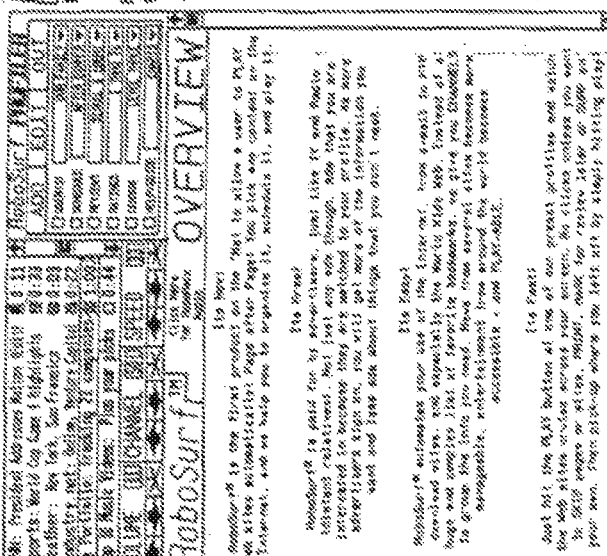
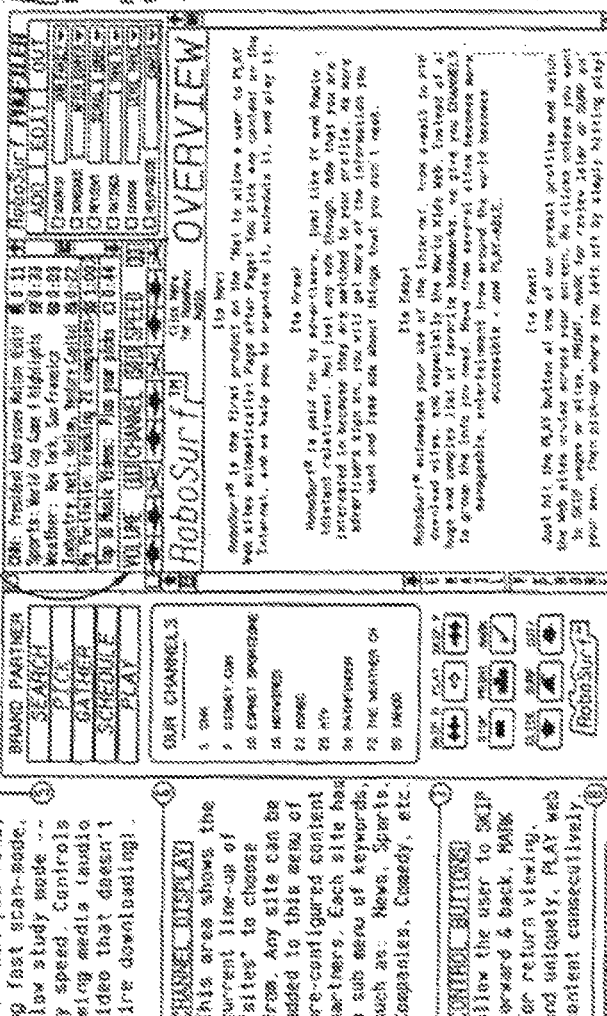
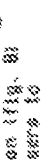
FIG. 7

AUTOMATED CONTENT SCHEDULER AND DISPLAYER

RELATED APPLICATIONS

This application is a continuation of U.S. patent application Ser. No. 11/316,209, filed on Dec. 21, 2005 which is a continuation of U.S. Pat. No. 7,155,451, filed on Sep. 1, 1998, which in turn is a Continuation-in-Part Application of U.S. patent application Ser. No. 08/922,063, filed on Sep. 2, 1997, which claims the benefit of priority from U.S. Provisional Patent Application No. 60/025,360, filed on Sep. 3, 1996, the entirety of which are incorporated herein by reference. This application is related to U.S. patent application Ser. No. 13/449,570, filed on Apr. 18, 2012 and U.S. patent application Ser. No. 13/176,618, filed on Jul. 2, 2011, both of which are also continuation applications from the same parent U.S. Pat. No. 11/316,209.

FIELD OF THE INVENTION

This Invention relates generally to computer networks, and specifically to a method of sequencing and scheduling web pages, via a suite of software applications.

BACKGROUND OF THE INVENTION

The worldwide network of computers commonly known as the "Internet" has grown tremendously since the creation of a subset known as the "World Wide Web" (WWW or Web), popularized in 1993. The emergence of the Web, and its accompanying standards enabled users to move beyond traditional on-line data exposure, which required knowledge of protocols and other low-level computer constructs, to a much more filtered and full-featured interface in the form of a "Web Browser." The Web Browser filters out the computer constructs, displaying only pertinent content, such as text, images, animations and sounds, while hiding from the user the computer codes that are used to negotiate access, generate and display this content. Some of the standards popularized by the web are Hypertext Transfer Protocol (HTTP), Hypertext Markup Language (HTML) and the Uniform Resource Locator (URL). HTTP allows HTML documents, which carry many forms of information, from text and images, to audio and video, to be easily found via a URL from a collection of networks known as the Internet. These networks have public and private files which are accessed via routing tables. The routing tables reside on Domain Name Servers (DNS) and are regularly updated.

Two innovations provided by the Browser environment, HTTP and the Internet are: specialized display of data (certain text and graphics) and "Hyperlinks" which appear as "clickable-buttons" or "links" made of text or graphics in the Graphical User Interface (GUI) presented by the Browser. These links contain an address for another location on the Internet. Instead of seeing computer language full of telecommunications protocols and an occasional listing of a graphic file's name, the user sees only human pertinent text and an automatically displayed image within this text. The user is shown graphical or textual links to facilitate navigation instead of having to properly enter complex path names.

This combination of features, coupled with the ease of use that HTML provides as a page publishing format, have proved to be very popular, leading to a mass adoption of this new medium by many constituencies. These include education, most areas of business (publishing, finance, commerce, entertainment, etc.) and government. Given the increasing adoption of the Web, many non-technically oriented users use this new medium to go from page to page, shifting from one computer network to the next simply by making decisions on which links to click. Search engines which index the Web allow these users to quickly locate URLs and their associated links. In addition, content aggregators collect and publish collections of Web pages. In just a few years, the Web has evolved from static pages to pages containing animation, personalized data, commerce-level security and, streaming audio and video. A more recent innovation, is the "Push Technology" model which is found in the more recently released browsers.

Push technology, pioneered by Pointcast™, has been adopted by Netscape™ and Microsoft™, the two browser giants, as the next way to connect viewers with content. As implemented by Pointcast, push technology began in 1996 as a personalized data gathering service. Users select content sources from a list and the Pointcast service automatically provides updated information which is displayed by the user's screen saver in a uniform format. Information providers who send information to users using the Pointcast system must first format their information according to requirements set by Pointcast. Thus, the "pages" of information displayed by the Pointcast screen saver are specially prepared screens. A user of the Pointcast system can access information only from those sources which have prepared information in the Pointcast format.

By collecting user interest profiles, the current "4.x" level browsers can constantly update a specific set of topics, from news, sports and weather, to financial and entertainment content. Thus, push technology enables information to come to the user instead of requiring the user to seek out the information. This not only facilitates a new distribution method for publishers and advertisers, but it also fosters new community models and demographics to go with them. As web browsing has evolved it has changed from a mere novelty, to a relied upon conduit of information flow.

Recently, problems with access to a major on-line service provider produced lawsuits stemming from lack of access to mission-critical information, in both receipt and transmission. As this technology has moved from budding curiosity browsing to true reliance, the blossoming of the technology has yet to show what mature fruit it will provide. Commerce is a large part of the development of the medium as companies like Cisco and Boeing conduct exclusive web-based sales in excess of one billion dollars. In addition, consumer and small business oriented vendors such as Dell have sales in excess of $1 million per day via their website. But what other services, beyond a catalog of information and products, will the Internet and its Web offer? The subject invention proposes a next-level of functionality that may provide an insight.

SUMMARY OF THE INVENTION

In accordance with one embodiment of the invention, a presentation software is employed in a web browser software. A triggering event, such as a mouse click on a single "link" commences the presentation of a series of resources instead of one resource at a time. This arrangement of resources, is defined as a "show structure" or "structure," which contains a set of nodes. Each node represents a resource such as a web page, an executable file, or a data file stored at a predetermined location and accessed via its corresponding address. This structure allows access to one or several topics of information from several sources in a continuous arrangement.

The topics of information include multimedia data such as audio, video, graphics and text that together define a presentation show to a user.

It is noted that in accordance with one embodiment of the invention the nodes that define a show structure or a structure may be arranged as a multidimensional sequence. An array of nodes may be available for a multimedia presentation or show. Each node in the array is accessible from the other nodes in the array. These nodes or a portion of these nodes are selected for presentation. A show structure is defined by one or more paths that are spanned through these nodes.

The information conveyed by displaying the resources arranged may be interspersed with advertising and public service announcements (PSAs). The presentation of all resources may be adjusted for different pacing attributes of individual users. While the invention may automate a number of the decisions that a user makes in viewing a plurality of resources, it in no way inhibits the interactivity currently present on the Web. The decision-making process is not inhibited: it is optional, allowing for preprogramming and navigating the arrangement of resources on-the-fly or simply watching a series of pre-edited resources. The present invention serves as an enhancement which refocuses the state of content delivery to a user via a communication medium, such as the Internet, TV/PC hardware and software offerings.

In accordance with another embodiment of the present invention a method of presenting information content is provided, which includes the steps of accessing and providing the information from an arrangement of content sources, or a show structure of nodes. Each node in the structure includes both an address from which the information may be accessed and an indication of the duration for which the content will be presented. For each node, the method locates the content source, accesses the content and presents it for the indicated duration.

According to another aspect of the invention, while the requested information is being presented, the method queues and caches the next resource, then loads the next resource for viewing.

According to yet another aspect of the invention, a method is provided by which structures of content sources may be generated. A user may select and organize content from a variety of sources by several methods including a bookmark list, a list of search results and through the creation of a structure of nodes by a "drag-and-drop" technique.

According to yet another aspect of the invention, a method is provided for generating and publishing these structures. When a plurality of nodes are available for presentation, the system determines the order of such presentation based on predetermined set of criteria. Furthermore, a user may specify additional criteria for arranging the order of nodes in order to create a show structure. The method further includes provisions for a filter which customizes a preexisting structure by automatically conforming variable items in the structure to a predefined user profile.

In accordance with another embodiment of the invention, the presentation system and method of displaying resources includes a system for presentation of a user's local computer resources. Therefore, the arrangement of resources may include a show structure wherein each node in the structure represents a resource that exists locally within the user's computer. These resources may be scheduled in accordance with a specifiable arrangement and executed in accordance with the schedule.

In accordance with another embodiment of the invention, the method for creating a show structure may be employed by a variety of user terminals, such as computer PCS, dumb terminals, TV sets and other terminals that are capable of displaying information. Furthermore, for certain applications, the method for creating and displaying content from various resources, in accordance with one embodiment of the invention, may function as an operating system for managing resources for display on the user's terminal.

BRIEF DESCRIPTION OF THE DRAWINGS

FIG. 1 is a block diagram which illustrates the Internet and the World Wide Web environment in which the invention operates.

FIG. 2A is a block diagram of a hardware system for utilizing the present software invention.

FIG. 2B-2F is an illustration of an exemplary node arrangements that define various show structures in accordance with one embodiment of the present invention.

FIG. 3 is a flow-chart diagram which is useful for describing a software application which runs on a server and sequences and displays URLs and predefined structure automatically in accordance with timer settings while monitoring the navigation decisions of the user, if any.

FIG. 4 is a flow-chart diagram of a client-side software application or Apple, which processes URLs and predefined structures automatically while monitoring the timer settings and navigation decisions of the user.

FIG. 5 is a flow-chart diagram which illustrates the process by which initial structures of content are personalized and delivered to the user.

FIG. 6 is a flow-chart diagram which illustrates a method of formatting individual resources and collections of resources for use with the resource scheduling and organizing software shown in FIGS. 3 through 5.

FIG. 6A is a graphical depiction of a process for editing a structure of nodes.

FIG. 7 is a computer screen diagram of an exemplary user interface for the invention that is useful for describing features of the invention.

DETAILED DESCRIPTION

FIG. 1 is a simplified block diagram which is useful for describing the connectivity of users and content providers on the Internet. Briefly, the Internet includes a large collection of content providers 10 which may be accessed by the users 12. Typically, a user accesses content on a "server" by establishing a data communications connection to the server through the network of computers 14, 16 defined by the Internet. Each server 10 operates a "web site" which includes data files that contain text, images, audio or video content. The web site typically includes a group of linked HTML documents or pages that contain links to the data files. A user 12 may access the content in a file by simply selecting one of these links. The file may be transferred to a cache in the user's computer and presented using the browser or the content may be provided directly by the server 10 to the user 12 as an encoded data stream (e.g. an audio program) which is decoded and played out by the user's computer 12.

Content accessed by the browser may not be in a file on a remote computer but may be generated by the remote computer and transmitted to the user directly. Much of the data that may be accessed by a browser on a remote computer is classified by Multipurpose Internet Mail Extension (MIME) type. One MIME type is an HTML file, another is a JPEG file, a still picture that is encoded according to the standard developed by the Joint Picture Experts Group. Mime types can also be proprietary data. In this instance, the browser may need to be configured with a "plug-in" program in order to decode and present the proprietary data. An example of such a plug-in is the Macromedia™ flash technology which allows streaming animation to be displayed with accompanying audio. For more, information on MIME types, see Netscape's User Handbook HTTP (HyperText Transfer Protocol) servers use HTML formatting. Netscape software has the built-in capability to read HTML-formatted pages (as well as the GIF, JPEG, and XBM graphic file formats). Netscape can interpret many other file formats with the help of external helper applications. To accommodate the file formats requiring helper applications, Netscape keeps a mapping of file formats to helper applications. MIME (Multipurpose Internet Mail Extensions) is a standardized method for organizing divergent file formats. The method organizes file formats according to the file's MIME type. When Netscape software retrieves a file from a server, the server provides the MIME type of the file. Netscape uses the MIME type to establish whether the file format can be read by the software's built-in capabilities or, if not, whether a suitable helper application is available to read the file.

For servers that do not provide a MIME type with a file, Netscape interprets the file's extension (a suffix appended to a file name). For example, the .HTML extension in the file name index.html suggests a file in the HTML format. Likewise, a .zip extension suggests a compressed file, an .rtf extension suggests a file in the Rich Text Format, and so on.

The Internet content relating to a show structure, in accordance with one embodiment of the invention, may be implemented as a new MIME type. Thus a show structure may be created by a show originator who intends to present a corresponding arrangement of resources to a user at a specifiable rate. The show structure may be transmitted to a plurality of users via the Internet. Thus, in order to ensure the integrity of a show structure a security arrangement in accordance with one embodiment of the invention is provided as described hereinafter.

Thus, the software that creates the show structure allows the show originator, to encode the identity of its creator. Furthermore, a mechanism is employed to automatically verify that the show structure comprising the show has not been tampered with. In one exemplary implementation, this is accomplished by using cryptographic techniques; for example the Digital Signature Initiative. The identity of the show originator is thus represented by a digital signature. The security status of the currently selected show structure is then visible at all times to the user. If a user chooses to edit a sequence of a show, the previously attached signature will be discarded and the user will be made aware of it's new unsigned status.

Today it is taken for granted that, to access services, information and entertainment on the Web, a user must make certain choices, position the mouse pointer and click the mouse buttons appropriately to indicate the decisions. For example, in a typical Web access, these selections are made at a rate of approximately once per minute. The result of each mouse click is another page and another set of decisions. Typically, a user is expected to click one of the several dozen links provided on any given page, (see, for example, cnn.com). Alternatively, a user may type in a URL or access a bookmark to visit a favorite search engine. In addition, a user may access a collection of "channels" of "push content" via Netscape Communicator's Netcaster or Microsoft Internet Explorer's Active Desktop and sit back for a few seconds to view an animated presentation of a specific publisher's offerings. The user may even choose a headline of a story presented in Pointcast's screen saver to receive more information about that topic grouping within the application, or to transfer to a relevant website. All of these methods typically require a significant amount of user effort and decision-making to drive the web surfing experience.

Although the users and servers are shown as separate machines in FIG. 1, it is well known that a computer being used as a server may host users and may also serve as a conduit for connecting a user to a remote server.

FIG. 2 is a block diagram which illustrates the basic layout of a typical user's computer, be it a personal computer (PC) or a network computer (NC), as typified by Webtv™ or a Java Station™. The computer may also be a dedicated workstation coupled to a local area network or a terminal connected to a mainframe computer which is, in turn, coupled to the Internet or other communication networks. The user requires no special hardware to use this invention. No additional cards with TV tuners are required, but they can be used as an enhancement. This diagram illustrates one possible environment for the invention and should not be interpreted as limiting the invention. It is contemplated that the invention may employ user terminals which may have radically different hardware, including but not limited to hand held devices, public kiosks, dumb terminals, set-top boxes, TV sets, and even "credit card-sized" configurations.

The exemplary system includes a microprocessor 32 a random access memory (RAM) 34, a memory management circuit, a disk drive 36, a floppy disk drive 37, a read only memory (ROM) 33 which includes the basic I/O system (BIOS) for the computer system, a CD ROM drive 42, a modem 50, a digital signal processor 43, a keyboard controller 38, a mouse controller 39, a video controller 40, and an audio controller 41 which are all connected by a system bus 31. A keyboard 22, a mouse 23 and a graphic display monitor 24 are connected to the keyboard controller 38, mouse controller 39, and video controller 40. Stereo speakers 25A and 25B are connected to the audio controller 41. In the exemplary system, the connection to the on-line-service provider 16 (shown in FIG. 1) is made through the modem 50 via a telephone line 56.

As shown in FIG. 2, the memory 34 includes an operating system 60, for example, Windows 95™; a browser 62 for example, Netscape Navigator™ 4.0; and a cache memory 63. The hard disk 36 is the main data storage device for the system shown in FIG. 1. It includes the software needed to run the browser and libraries of software used by the operating system to control the operation of all of the components that are connected to the system bus 31. The hard disk 36 also includes a disk cache (not shown) for the browser. When data on a remote computer is accessed by the browser, it may be transferred by Hypertext Transfer Protocol (HTTP) or File Transfer Protocol (FTP) and stored in this disk cache temporarily. The component of the invention which is used on the user computer 12 may be, for example, a browser plug in. While, in this example, the user component is a browser plug-in, it is contemplated that it may be an Applet which runs on a virtual computer defined by the browser, it may also be a stand-alone program, which includes the functionality that is typically provided by a browser, or it may be a distributed application. The user component is described below with reference to FIG. 4 and is referred to as the program Robo-Surf™. The RoboSurf program allows a user to view a show having content that corresponds to a show structure as will be explained in more detail later.

It is noted that in accordance with one embodiment of the invention the nodes that define a show structure or a structure may be arranged as a multidimensional sequence. FIG. 2b illustrates an array 300 of nodes that may be available for a multimedia presentation or show. Each node identifies an available resource and the time the resource may be presented to the user. As illustrated in FIG. 2B nodes 302, 304, 306, 308, 310 and 312 are available for presentation in accordance with an exemplary arrangement. Each node in the array is accessible from the other nodes in the array. For a typical show or presentations, an arrangement of these nodes or a portion of these nodes is selected for presentation as described in reference with FIGS. 2c through 2f. Thus, a show structure is defined by one or more paths that are spanned through these nodes.

FIG. 2c illustrates a show structure that simultaneously spans multiple paths from the same starting node such as node 310 to each one of the remaining nodes 312, 302, 304, 306 and 308. Thus, a show in accordance with the structure presented in FIG. 2c simultaneously presents the contents identified by nodes 312, 302, 304, 306 and 308, after the content identified by node 310 is presented.

Alternatively, as illustrated in FIG. 2d-1 a show structure can span a path with a length of four beginning at node 308 and traversing to nodes 312, 302 and 306. The state map of this path is illustrated in FIG. 2d-2. Thus, a show in accordance with the structure presented in FIG. 2d-1 first presents the contents identified, by node 308, followed by contents identified by nodes 312, 302 and 306.

In a still alternative arrangement, a show structure can be created that also spans multiple paths concurrently, as illustrated in FIG. 2e. For example a first path spans nodes 308, 302, 306 and 310. The second path spans nodes 312, 306, 304 and 310. As illustrated nodes 302, 306 and 310 are spanned simultaneously with nodes 306, 304 and 310. Thus a show in accordance with the structure presented in FIG. 2e first presents the contents identified by node 310, followed by the contents identified by node 312. Thereafter, the show structure presents contents identified in nodes 302, and 306 at the same time that is presents the contents identified in nodes 306 and 304. Finally, the structure presents contents identified in node 310.

Thus, a show structure may include one or more paths that can be presented sequentially and/or concurrently. It is noted that a path may include portions that is presented sequentially and other portions that are presented concurrently. Furthermore, one node to many nodes paths and many nodes to one node paths can also define a show structure. Every time that a node is detected the corresponding content of that node is presented to the user's terminal regardless of whether a plurality of nodes have been detected at the same time or separately.

It is noted that the process that creates and/or organizes and manages the arrangement of these nodes and ultimately the corresponding resources, may be implemented as a user specific operating system in accordance with one embodiment of the invention. The operating system then allows the paths to be selected and arranged in accordance with interactive user specifications or in accordance with predefined criteria. Thus, the operating system, among other things, organizes and arranges the available resources as identified by available nodes; allows end users to select and interact with files and applications; and make certain files and or resources available to be shared by all the other resources. For example, during a presentation of a show, certain sound effects and visual effects may be shared by all resources that may have use for such effects. Such an operating system can be employed for many applications described herein in accordance with various embodiments of the invention.

A show structure may be presented on a server that can be accessed by a user who visits a corresponding site on the server. This component on the server is described below with reference to FIG. 3, and is referred to as the program Robosites™. Robosites may perform the actual transfer operations to obtain the pages from other web sites.

In addition to RoboSurf and Robosites, the exemplary system includes RoboGuide™, described below with reference to FIG. 5, a program that allows several users to access a prepared show structure of nodes or links and have it customized to their respective preferences. The system also includes a program referred to as RoboPublisher™, described below with reference to FIG. 6, which functions as a publishing software so as to help a publisher to prepare show structures. The entire suite of programs is referred to below as RoboCast.

Referring again to FIG. 3 a flow-chart diagram which illustrates the operation of the server-side application, Robosites is explained in more detail. The first two steps in FIG. 3 represent activities occurring at a user's computer 12. At step 70, the user starts to access the Internet or other network via a Personal Computer (PC) a Network Computer (NC), Web-Enabled TV Set, or other similar device. At step 72, the user encounters and selects a URL, for example, within a screen saver, an e-mail message, or a website, which is designated as an entry node in a show structure of resources. The URL may be so designated by its association within a list generated by a publisher, by results that are automatically generated by a search engine or because it is the first URL in a show structure of URL's that was manually collected by the user. The server stores a plurality of show structures each structure including nodes that represent a resource on the Internet. Thus, each structure represents a show that is available for the user's preview.

Accessing the resources referred to by the URL initiates a structure of events in the application Robosites which is running on server 10, shown in FIG. 1. At step 74, the server parses the request into task sets, initiating the look-up of the resources indicated by the URL. This step gathers the relevant data and custom packages it for the browser 62, shown in FIG. 2. As part of its custom packaging application Robosites provides a set of contents that can be displayed on the user's display terminal in the form of a persistent content window. Therefore, a small window on the user's screen begins to display contents that is provided by the server, such as advertising or user specific messages. Furthermore, as part of its custom packaging application, Robosites may arrange the location on the screen where the user can view a selected show, and also updates show structures that had been previously used by a user and had been cached in the user's computer.

At step 76, Robosites checks whether the user is intended to receive information in a dynamic arrangement referred to as value added dynamic content. As will be explained in more detail below such value added dynamic content may include additional URL locations or files that are deemed by Robosite system to be of interest to the user, such as advertising material. Such dynamic content is usually based on, among other things, the user's profile. For example, some of the factors relating to a user profile, which are considered include a particular sports team preference; a demographic; or a pre-set profile as specified in the software. This information is used as selection criteria which is sent to a database and, at step 78, a page, conforming to the user's preferences, is retrieved by the server, either locally or from a remotely located database. Thus, this dynamic content may be presented in the persistent content window of the user's display screen or as information and messaging contents selectively interspersed between a show structure.

At step 80, if the resource addressed by the URL does not include dynamic content or if the user is unable to receive dynamic content, a resource having pre-defined content is retrieved, either directly from a Robocast-operated resource, or from a third party with prior authorization to handle such content requests. For example, a resource having a default set of advertising content may be presented to the user.

At step 82, either the dynamic or pre-defined URL is accessed and the content associated with the URL is retrieved, encoded and delivered to the browser at step 84. The content provided from the location addressed by the URL may be among other formats, include HTML, DHTML or XML documents. The delivered information may contain references for many other data types, including animation, streaming and non-streaming audio and video, Virtual Reality Modeling Language (VRML) Quicktime VR; and front-ends for several flavors of database applications, to name a few.

At step 84 the content retrieved by RoboSites is delivered ty the user's browser for a show presentation. This step is inherent in the operation of browser 62 (shown in FIG. 2), accordingly, it is not described in detail. At step 86, a timer is started in response to a message produced by the browser 62 indicating that the retrieved content has been delivered and is ready to be presented. This timer is set from a value provided in the corresponding node in a show structure which indicates an amount of time that the content accessed from the associated URL is to be displayed. It is noted that RoboSites provides an additional code to the content corresponding to the amount of time the content is displayed. For example, for an HTML file, Robosites includes additional tags corresponding to the duration that the HTML document will be displayed by the user's browser.

At step 88, Robosites determines if the user has selected another URL before the timer expires. It is noted that the user may select another URL either manually or via a RoboSurf program that resides on the user's computer. In that event the newly selected URL is based on a node within a show structure that is being executed by the user's RoboSurf program. If another URL has been selected, the program will do one of two things: 1) forward that user away from the predetermined course of the show structure that was entered at the beginning of this process and take the user on another course, based on the other URL selected; or 2) skip them forward on the predetermined course that is being played for the user in accordance with the selected structure. This latter scenario is advantageous for a quick reader, or someone who has seen the presented content before, or in the case of content that the viewer chooses to skip (even an advertisement or PSA).

If the user has selected a new URL during the display time allowed by the timer, then, at step 90 Robosites determines whether the next URL relates to a show structure or not. This may be determined simply by the lack of new URL requests. It may also be determined by checking the header information of the new URL, as described below with reference to Table 1. As shown in step 93, the user's decisions are recorded to a database at this point, providing a list of feedback for advertisers and content providers in some cases. If, for example, an advertisement for cat food is displayed, a user may skip over the advertisement or otherwise indicate that cat food advertisements are not interesting. This information is recorded at step 93 and used to direct only advertisements that are of interest to the user.

If at step 90 it is determined that the next URL does not relate to a show structure, then at step 98, after the user decision is recorded at step 93, the chain session is ended at step 98 and the roboguide screen saver is started at step 100. If the next URL does relate to a show structure, then at step 94 the system requests the next resource in the show structure and returns to step 74 described above. It is noted that in accordance with another embodiment of the invention, it is possible to change the course of events to be displayed to the viewer by substituting next resource request at step 94 with a previous resource request. For example, if the forward going display provides a first URL content relating to weather forecast to a second URL content relating to sports news, the reverse going display provides the sports news before the weather forecast.

It is also noted that a user may switch to another set of show structure at any time by selecting a desired structure, for example by a Robosurf program employed by the user's computer. The instructions relating to the newly selected path in a structure may be provided via point A as illustrated in FIG. 3. Furthermore, a newly selected path in a structure may also be diverted back to the prior show structure by using the application's "surf" feature (described below with reference to FIG. 7). The user's selections are tracked by the user's Robosurf program. Thus, for example when a URL relating to a second show structure is selected, by being clicked for the first time, the system remembers where the user left the initial structure and returns the user to that point in the structure upon the second click of that surf button. Alternatively, the history feature, inherent in most browsers, may be used to return the user to pages that were presented moments before or days before.

If, at step 88, the user does not interact with the system within the allotted time (which is set by the user or publisher), the timer expires at step 92 and that signals the request for another resource, thus enabling the play sequence for automatic surfing.

At step 96, the program requests the next node in the currently playing show structure. While this sequence has been described as a simple display of preprogrammed URLs, it is contemplated that, in more complex forms, this process may stream URLs to the viewer, while monitoring the user's habits (e.g. which sites are skipped and which sites the user views for the full display time) and injecting targeted content, including news, advertising and PSAs into the data stream.

If the URL selected at step 88, before the time-out, is not another show structure, the Robosites process displays the selected content and resets the timer. If no additional content is available, a user-specified show structure will be optionally displayed.

FIG. 4 is a flow-chart diagram which illustrates the operation of the exemplary user component of the system, referred to as the RoboSurf program, in accordance with one embodiment of the invention. Briefly, this program allows a user to schedule, personalize and play content obtained from Web addresses. Using RoboSurf, a user may access almost any accessible website as a node in a structure. It is noted that while RoboSurf is described as a browser plug-in, it may be an Applet, stand-alone program or distributed application.

The RoboSurf process illustrated by FIG. 4 begins at step 110 to access a default list, of URLs that may be generated by, for example, one of several sources, such as: 1) RoboCast's web server network that will supply a general listing of available show structures; 2) a pre-selected list generated by the server in response to information obtained about the user from a Profiler program (e.g. structures defined for an Intranet described below with reference to FIG. 6); 3) the results of a Search initiated through the RoboCast system or through a non-affiliated search engine; 4) an e-mail message, 5) the contents of a screen saver's play queue; or 6) other delivery methods.

At step 112 the URL is delivered to the browser 62 by one of these methods in a traditional manner. This corresponds to step 84 of FIG. 3, described above. Also at step 112, the content is received and/or activated either automatically or programmatically for presentation to the user. Once RoboSurf begins to display the content, it starts a timer, at step 114. This timer has a duration that is determined from the information contained in each node of the current show structure that corresponds to this URL.

At step 116, While the timer is running, RoboSurf monitors the user's actions to determine if the user wants to manually override the play sequence by clicking a URL before the time-out. The user may act in several ways to override the play sequence. First, the user may select a node or a link on the displayed resource at step 122. In this instance, if the selected link is itself part of a show structure, the program goes to step 124, and the newly selected show structure replaces the current structure. If the selected link is not part of a show structure, the program goes to step 120 to get the next resource of the initial structure and the timer is reset and play continues at step 112.

Second, the user may click on the Surf button, in the control buttons 7, shown in FIG. 7, and then select a link on the displayed resource. By pressing the Surf button, the user temporarily suspends the display of the original show structure, to review contents of pages accessible by hyperlinks presented on, a displayed page. When this review is complete, the show structure may be restarted at the point of departure by simply clicking on the Surf button a second time.

At step 118 if the user has not selected any URLs, the time-out occurs and the play sequence resumes at step 120. In the exemplary embodiment of the invention, this step highlights the next item in the schedule window 2 (shown in FIG. 7), selects the corresponding URL and branches back to step 112, causing Robosites to deliver the content at the requested URL to the browser 62. It is noted that in accordance with one embodiment of the invention, either RoboSurf or Robosites programs may operate independently without interaction with the other.

FIG. 5 is a flow-chart diagram which illustrates the operation of the RoboGuide component of the RoboCast program suite. RoboGuide is a helper application that provides a viewing guide which offers a personalized look at various show structures of content that have been cached at the server. RoboGuide interacts with information produced by a Profiler program to modify the cached show structures to eliminate content or add alternate content according to a user's preferences.

RoboGuide program starts at step 150 where the user starts access to the Internet or other network via a Personal Computer (PC) a Network Computer (NC), Web-Enabled TV Set, or other similar device. The user encounters and selects a URL which has been designated as the entry node in a show structure of resources by a publisher. This URL may be encountered, for example, within a screen saver, an e-mail message, or a website.

In accordance with one embodiment of the invention, the server terminal that employs the RoboGuide program stores a plurality of various show structures that may be of interest to the users. These show structures may relate to different topics or subjects that visitors may have access via the server. An example of such a server may be a search engine such as those available by YAHOO® or EXCITE®. In accordance with one embodiment of the invention, the RoboGuide program may prepare various show structures based on a user's search specifications. The results of a search may include a plurality of URL locations that contain pertinent information relating to the search topic. In response, the RoboGuide program creates a show structure that includes all or portion of the uncovered URL locations as the result of the search.

At step 152 the RoboGuide program receives a request from a user for a URL location that is provided by the server. At step 154, the program retrieves from its database a show structure corresponding to the user's request. For example, the server may present a show on travel defined by a show structure prepared by the RoboGuide program.

It is noted that in accordance with one embodiment of the invention, the RoboGuide program may create a customized show structure based on the user's preferences that can be obtained in accordance with various filtering techniques commercially available. The server may already have information on the user, for example, via a profiler program that the user had previously updated via a RoboSites program as described above in reference with FIG. 3. Thus, based on such adaptive filtering technique the RoboGuide program creates a personalized content that can be delivered for each user or groups of users.

At step 155 the program employs a filtering technique to create the customized show structure. An exemplary filtering process may be that which is available from Firefly.net, described below. This filtering is based on rating the resources (e.g. rating a cat food advertisement as inappropriate if the user profile does not indicate that the user has a cat or if the user indicates disinterest in cat food advertisements either explicitly by clicking on an on-screen "button" (not shown) indicating disinterest or implicitly as may be inferred from a pattern of skipping over cat food advertisements when they are presented). The information generated by the Profiler program is fed to the server based on "cookie technology," a common method of maintaining information about a client on the web. The server reads the cookie for preferences and date information then feeds a personalized request to the database which sends a dynamically generated list of URLs to the user at step 156.

At step 158, in response to the received show structures, the RoboSurf program residing at the user's terminal parses the data and displays the nodes in the structure in its Schedule window 2 (shown in FIG. 7). In response to the user's request a show structure is then presented to the user by either a RoboSurf program as described in reference with FIG. 4 or by a RoboSites program as described in reference with FIG. 3.

The following description of an exemplary filtering technique used by Firefly.net was obtained from their Web site at. Collaborative filtering technology is a powerful technology that can effectively address the problem of information and content overload, especially in highly subjective domains. Collaborative filtering systems use human intelligence instead of machine intelligence to address the limitations of content-based filtering systems. By leveraging human opinions, collaborative filtering systems automate the word of mouth process among users. Automated Collaborative Filtering (ACF) systems automate the word of mouth process on a global scale across hundreds of thousands of users and catalog items. Most ACF systems recommend items using the following three step process:

1. Capture a set of opinions from the user in the form of numerical ratings for items 2. Compute a set of "nearest neighbor users" for the user. These nearest neighbor users are users with opinions most like the given user. 3. Use the nearest neighbors ratings to compute a set of recommendations for the given user. While standard ACF systems are effective in subjective domains, they suffer from certain limitations that may cause them to make incorrect conclusions in broad domains. This is mainly due to their tendency to ignore information about the items being recommended, even when such information is readily available.

Feature-Guided Automated Collaborative Filtering (FGACF) is Firefly Network Inc.'s powerful technology that combines the benefits of collaborative filtering with those of content-based filtering to overcome the limitations that affect standard ACF systems. FGACF utilizes simple feature information about items in a catalog to dynamically partition the space of items on a personalized basis, so as to more effectively apply the ACF algorithm in the appropriate sub-space.

Designers and developers of commercial collaborative filtering systems need to address several challenging issues. The foremost issue in building large scale collaborative filtering systems is the scaleability of the system. The accuracy of the underlying collaborative filtering technology, and the set of functionality offered, are important factors for designers of such systems.

Firefly Network Inc.'s Catalog Navigator product is scalable to handle loads of hundreds of thousands of users, catalog sizes in the half million range, with number of ratings in the millions, and still provide sub-second response times to queries. It has already been successfully deployed in applications on high-traffic sites. In addition, the Catalog Navigator is the only commercial implementation this powerful FGACF technology and offers one of the most comprehensive sets of catalog and community navigation functionality to a customer. © Firefly Networks Inc. 1997.

It is noted that in accordance with another embodiment of the invention, the information presented to the user based on the show structures may be reformatted in accordance with certain default structure characteristics. For example, such reformatting may include the tasks, such as: making Web resources more reader-friendly when using RoboSurf, RoboSites or RoboGuide programs, by utilizing formatting parameters, such as restraining page size to a default screen size and cuing automatic playing of audio upon displaying a new page; providing "Play," "Stop," "Forward," "Reverse," and "Pause" indications to facilitate the user's viewing of a show presentation; making pages into parts of a of content; providing information tags relating to the duration that a content is going to be displayed on the user's terminal; and, encoding pages with certain demographic and keyword-based information to aid the filtering operations explained above.

Table 1 shows an exemplary HTML code that may be added in accordance with one embodiment of the invention, to the Web resources or other content that is being reformatted. Note that the HTML of a page can be altered in this way between downloading it from a server and presenting it to the user. This "Tagging" process only requires a few milliseconds and can be done on the fly.

Essentially, this module uses the abilities of a HTML page publishing package like Pagemill from Adobe (www.adobe.com) to add HTML code of the type shown in Table 1.

TABLE 1

```
<!DOCTYPE HTML PUBLIC "-//IETF//DTD HTML 3.0//EN">
    <html>
    <head>
    <title>RoboGuide 11/3/97</title>
    <META name="author" content=" © 1997 Damon Torres,
Brian Foy">
    <META name="generator" content="RoboSites
1.0">
    <META name="keywords" content="news, sports, weather,
lifestyles, jane q. public, nyc weather, san francisco weather,
washington d.c. weather, yankees, knicks, non-violent news,
```

TABLE 1-continued

```
parenting info, content filter 530.145x2a, ad filter 398543*kjfd23,
psa filter 19284jksd8sfj*659">
    <META name="description" content="Jane Q. Public's
personalized news, sports and weather. Contains preferences for
cities, teams, content filters (i.e. sex, violence, language) and
preferences for advertising and public service announcement
categories. Wildcard parameters are indicated by an asterix (*).">
    <META HTTP-EQUIV="Expires" content="Tue, 04
Nov 1997 18:45:23 GMT">
    <!-- see http://www.sandia.gov/sci_compute/elements.html for
    details -->
    <LINK rel="previous" href="some url">
<LINK rel="next" href="some url">
    <LINK rel="toc" href="url of channel description"><!--
        toc=Table of
    Contents-->
    </head>
    <body>
    <!-- content goes here -->
    </body>
    </html>
```

FIG. 6 is a flow chart diagram that is useful for describing the operation of a RoboPublisher program, which is the publishing tool used to create and modify show structures for viewing via RoboGuide, RoboSurf and/or Robosites. The first step represents activities occurring at the user's computer 12. At step 200 the user access the program described in this flowchart. At step 210 the user selects between editing an existing show structure or creating a new one. This can be an existing structure that has been previously made, or a structure that another content provider has published. If the user is creating a new structure, the resources, or nodes of the structure, can be gathered from their local hard drive or server or from a remote server.

At step 212 the user is presented with a dialog box. At step 214 the user is presented with the dialog box options for setting general preferences for all of the resources that will be linked in the structure, such as duration for all resources, duration estimate based on word count, and default "page turn" sound to accompany an automatic resource delivery.

At step 216 the user has chosen to load a previously defined structure, and, at step 218 the computer requests and loads the structure from the local or remote drive. Beginning at step 220 the user has many options, presented by an interface that will allow the user to choose to "Add, Edit or Cut" a node for the structure they are building. This can be accomplished graphically, as shown for example, in FIG. 6A or via a list. In step 222 the user may Add a node from a standard dialog box that enables browsing from all available drives and from a special cache area that RoboSites, RoboSurf and/or Robosites produce. This cache area allows users to collect URLs from the Internet by, for example, browsing, implementing searches, or culling-their e-mail for additional show structures. At step 224 the user adds the node at the chosen spot in the structure.

At step 226 the user has the option to commit to changes or cancel and start again. At step 228 the Modify Choice selection gives the user options 230 to edit the parameters of the "next" node (i.e. changing the next node destination or previous node in the structure from, for example, a local news link to a local weather link). The duration choice pertains to how long the node will be displayed before a subsequent node is loaded. This can be done on a per resource basis, since some resources require more time than others. The expiration option allows the publisher to choose a "kill date" for the node, automatically triggering a replacement search, or a skip to next action. This is useful for dated information such, as weather.

At step 232 the user has the option to delete a node from the structure. Again, this can be done graphically (as shown in FIG. 6A) or via a list. This step leads to step 234 where the previous structure is linked to the node that succeeds the deleted node. Step 236 allows the user to choose to continue adding, editing and/or cutting by branching back either to step 220 or 238, to save the work and/or export it for a preview or viewing by others. If the user does not choose to save or export, then, at step 244, the program reverts to the last saved version or cancels the session. If the user does export then, at step 240 the program writes the changes to the local disk 36 (shown in FIG. 2). The RoboSites program may, in turn, write header information to the files to which the user may access locally or even to remote server files. It should be noted that the writing of header information into the HTML documents is an option, providing a convenience for RoboSurf and Robosites programs. The page playing actions can be achieved without this header information present. The publisher completes its work at step 242 where it gives the option to preview for the publisher using RoboCast browser enhancements, or to publish for other RoboCast product users.

FIG. 7 is a screen diagram of the interface presented by the RoboSurf program. Item 1 on the screen is an interface to the Profiler program. This program allows a user to specify several profiles for RoboSurf. The user may select from prepared profiles, for individuals or groups for example, "Internet. Professional," "Lawyer," "Student," "Family.1" and "Girl: Preschool" and modify these or create a new profile. In the Profiler window, the User field allows a name to be attached to the profile. The Schedule field allows a user to associate the profile with a particular structure, also referred to as a Schedule. In this instance, the structure of URLs being displayed in the Schedule window 2 is named "After Dinner."

The Reviews field allows a user to specify one of several sources for website or show structure reviews. Using the Ratings field, the user can specify limitations on the type of website or structure that will be reviewed using the familiar MPAA rating system. The Censor Level field may be used to control the Web content that the user will see. Different Censor Levels will allow different types of content to be displayed. The RoboSurf program may compare the specified Censor Level to voluntary content ratings obtained froth the Web resources or it may interface with an existing content monitoring system such as Cyber Patrol to ensure that undesirable content is blocked. The final field in the Profiler window allows a user to specify a Help or Guide function. It is contemplated that both text-oriented and voice synthesized help would be available. For voice-synthesized help, the user may identify a particular voice with a name (e.g. "Chris") as shown in FIG. 7.

Item 2 in FIG. 7 is the Schedule window. As described above, this window shows the current structure of URLs that is being displayed by RoboSurf. The window contains a brief textual description of each URL and a time in hours and minutes and seconds for which content provided from the URL will be displayed. The URL from which content is currently being displayed is highlighted. Each URL in the schedule list also includes a small box which is marked with an "x" after a URL has been viewed and, may be marked with a " " to indicate that the user wants to return to this site.

Item 3 in FIG. 7 are controls for volume, channel and speed. The volume control works as would be expected to increase or decrease the level of sound provided. The Channel button allows a viewer to move a pointer up and down in the channel window to select a new channel. As used in this description, a "channel" is a collection of resources, such as web pages, which are linked into a structure by a content provider. The Speed button allows a user to specify the amount of time between the content of resources. The "*" button on each of the volume, channel and speed buttons brings up a separate dialog box in which specific entries may be entered manually.

Item 4 in FIG. 7 is the progress bar. This bar displays progress of the system in whatever it has been requested to do. During play mode, this bar displays progress through the structure as a percentage of time remaining in the display of the structure. In search mode, the bar may display progress in a search and the preparation of a show structure derived from the search. In gather mode, the bar may display the progress of the gathering operation.

Item 5 in FIG. 7 are the programming bars. The Search button allows the user to establish criteria for a search of the Internet for URLs to be included in a show structure. The Pick button lets a user select categories within established information sources in order to make selections within the specified sites. Once Search Criteria-and Pick categories have been established, the Gather button retrieves information from the selected sources according to the user's criteria at a specified time and frequency. The Schedule button allows the user to group site content by topic and then set the time when specific group will be played. The Play button begins the presentation of information. In the exemplary embodiment of the invention, the Play button also lets a user set parameters such as size of the content window, length of time each item is displayed and, if RoboSurf is being used as a screen saver, screen saver activation parameters (e.g. delay time, autostart position of cursor and password).

Channel window 6 displays structure publishers that may be accessed by a "point and click" operation. This window is analogous to a "favorite places" list in a conventional browser.

Control window 7 contains buttons which allow a user to Skip backwards and forwards through the show structure displayed in the Schedule window, Play the information provided from the structure of URLs, Stop playing this information, Print the information that is currently being viewed, and Mark the current resources for later viewing.

In the exemplary embodiment of the invention, the Mark button interacts with the Play and Print buttons. While viewing contents relating to a show structure, a user may mark individual resources. After viewing the show structure, the user may specify that the marked resource be displayed again, queued for printing or displayed and printed. This feature may be activated, for example, through the play or print buttons by activating the buttons with a modifier key, for example, the right mouse button.

In addition to these buttons, the control window also includes an Add/Up button which allows a user to add resources to a structure when it is being set up in schedule mode and allows a user to move up the hypertext links that are being displayed on the screen during play mode. The Cut/Down button conversely allows a user to delete a site from the structure during schedule mode and move down the hypertext links during play mode. The function of the Surf button is described above. This button allows a user to temporarily suspend the viewing of a structure with a first button press and resume at the suspended site with a second button press. In accordance with another embodiment of the invention the functions described above in reference with FIG. 7 are embodied in a separate remote control hardware device, item 8.

The e-mail and video phone buttons, item 9 on the display shown in FIG. 7, invoke third-party software packages, one for e-mail and one for a video telephone product. Item 10 in the display is the content window. This is where all of the content which is Found, Picked, Gathered, Reviewed, Rated, Censored, Edited and Scheduled is finally and automatically played. The process of playing the content is like television mixed with radio, newspapers and a research library.

While the invention has been described in terms of an Internet browser application which allows a user to view or create a show structure of content from various sites, it is contemplated that it may be used for other purposes. For example, the invention may be used as a jukebox to schedule and present successive audio or video recordings or to schedule and view pay-per-view movies or videos.

As illustrated in FIG. 6A a show structure of resources may be created and played in accordance with various embodiments of the invention. These resources may include, for example, various local application files on a user's computer. Thus, a user may view information relating to various executable-programs in a selected arrangement on a desired schedule. A typical example, involves a user system that contains an accounting software, an on-line banking software, an Intranet e-mail program, and a calendar program. The user creates a show structure that executes each of these programs and displays the relevant information at a predetermined rate. This allows the user to automate various tasks that are currently accomplished manually. Thus, for example, the user on a daily basis can check received e-mail, followed by the user's schedule for the day, available funds in the user's bank account. The selected information are presented automatically in an organized arrangement. It is noted that in accordance with another embodiment of the invention, a show structure may include the user's local resources and other remote resources as those explained above in reference with Internet applications.

While only certain features of the invention have been illustrated and described herein, many modifications, substitutions, changes or equivalents will now occur to those skilled in the art. It is therefore; to be understood that the appended claims are intended to cover all such modifications and changes that fall within the true spirit of the invention.

The invention claimed is:

1. A method for providing content providing a communications network on a user's computer, obtained from a plurality of resources in an organized arrangement comprising the steps of:
    creating a show structure of nodes, each node identifying a resource from a plurality of accessible resources, at least some of which are network accessible resources;
    without requiring user input, automatically accessing a. plurality of said network accessible resources identified by a corresponding node;
    causing content corresponding to each of said accessed resources to be automatically accessed and presented through said user's computer in accordance with said show structure such that during said presentation of at least some of said content from said accessed resources, at least some of said other network accessible resources are being accessed;
    providing interactively variable duration information, representing the duration that said content corresponding to said resource is presented so as to enable a. user to vary said duration; and
    causing advertisement content to be presented to said user in connection with said automatic presentation of said content through said user's computer.

2. The method in accordance with claim 1, wherein said step of providing interactively variable duration information further comprises the step of providing interactively variable duration information for each of said accessed resources, representing the duration within which a corresponding content to said resource is presented.

3. The method in accordance with claim 1, wherein said interactively variable duration information is displayed to the user.

4. The method in accordance with claim 3, wherein said display of said interactively variable duration information to the user occurs during presentation of said content.

5. The method in accordance with claim 1, further comprising the step of providing a play bar to enable the user to vary said duration that said content is being presented.

6. The method in accordance with claim 1, further comprising the step of providing control buttons to enable the user to vary said duration that said content is being presented.

7. The method in accordance with claim 6, wherein said control buttons provide for at least pause, fast forward and rewind functions to be applied to said content being presented.

8. The method in accordance with claim 1 further comprising the step of providing control buttons to enable the user to affect the presentation of said advertising content.

9. The method in accordance with claim 8, wherein said control buttons provide for at least skipping of said advertisement content being presented.

10. A method for providing content via a communications network on a user's computer, obtained from a plurality of resources in an organized arrangement comprising the steps of:
    creating a show structure of nodes, each node identifying a resource from a plurality of accessible resources, at least some of which are network accessible resources;
    without requiring user input, automatically accessing a plurality of said network accessible resources identified by a corresponding node;
    causing advertisement content to be presented to said user in connection with said automatic presentation of said content through said user's computer;
    causing content corresponding to each of said accessed resources to be automatically accessed and presented through said user's computer in accordance with said show structure after said presentation of said advertisement content such that during said presentation of at least some of said content from said accessed resources, at least some of said other network accessible resources are being accessed; and
    providing interactively variable duration information, representing the duration that said content corresponding to said resource is presented so as to enable a user to vary said duration.

11. A method as claimed in claim 10, wherein said step of causing advertisement content to be presented to said user includes determining said advertisement content based on a user profile.

12. A method as claimed in claim 11, wherein said le includes past actions taken by said user.

13. A method as claimed in claim 10, wherein advertisement content is presented in a persistent content window during said presentation of said content corresponding to at least one of said accessed resources.

14. A method for providing content via a communications network on a user's computer, obtained from a plurality of resources in an organized arrangement comprising the steps of:

creating a show structure of nodes, each node identifying a resource from a plurality of accessible resources, at least some of which are network accessible resources;

without requiring user input, automatically accessing a plurality of said network accessible resources identified by a corresponding node;

causing content corresponding to each of said accessed resources to be automatically accessed and presented through said user's computer in accordance with said show structure such that during said presentation of at least some of said content from said accessed resources, at least some of said other network accessible resources are being accessed;

causing advertisement content to be presented to said user in connection with said automatic presentation of said content through said user's computer, wherein said show structure of nodes includes at least one node identifying a resource corresponding to an advertisement content; and providing interactively variable duration information, representing the duration that said content corresponding to said resource is presented so as to enable a user to vary said duration.

15. A method as claimed in claim 14, wherein said advertisement content is video content.

16. A method as claimed in claim 14, wherein said advertisement content is displayable content.

17. A method as claimed in claim 14, wherein said at least one node identifying a resource corresponding to an advertisement content comprises a URL.

18. A method as claimed in claim 14, wherein said at least one node identifying a resource corresponding to an advertisement content is dynamically inserted into said show structure of nodes.

19. A system for providing an automatic presentation of content on a user's computer, obtained from a plurality of resources in an organized arrangement, said system comprising:

a hardware server configured to provide a show structure of nodes, each node identifying a resource from a plurality of accessible resources, at least some of which are network accessible resources;

said hardware server further configured to cause advertisement content to be accessed and presented to said user in connection with said automatic presentation of said content through said user's computer; and after said presentation of said advertisement content, said hardware server further configured to cause content corresponding to a plurality of said nodes to be automatically accessed and presented to said user in accordance with said show structure without requiring user input, such that during said presentation of at least some of said content from said accessed resources, at least some of said other network accessible resources are being accessed, said hardware server further configured to provide interactively variable duration information, representing the duration that said content corresponding to said resource is presented so as to enable a user to vary said duration.

20. A system as claimed in claim 19, wherein said advertisement content presented to said user includes advertisement content based on a user profile.

21. A system as claimed in claim 20, wherein said profile includes past actions taken by said user.

22. A system as claimed in claim 19, wherein advertisement content is presented in a persistent content window during said presentation of said content corresponding to at least one of said accessed resources.

\* \* \* \* \*